United States Patent
Yao et al.

(10) Patent No.: US 8,253,390 B2
(45) Date of Patent: Aug. 28, 2012

(54) POWER SUPPLY DEVICE AND SYSTEM

(75) Inventors: Kui Yao, Singapore (SG); Yee Yuan Tan, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 200 days.

(21) Appl. No.: 12/438,121

(22) PCT Filed: Aug. 22, 2007

(86) PCT No.: PCT/SG2007/000269
§ 371 (c)(1),
(2), (4) Date: Dec. 10, 2010

(87) PCT Pub. No.: WO2008/024078
PCT Pub. Date: Feb. 28, 2008

(65) Prior Publication Data
US 2011/0084669 A1    Apr. 14, 2011

Related U.S. Application Data

(60) Provisional application No. 60/839,547, filed on Aug. 22, 2006.

(51) Int. Cl.
*H01M 10/46* (2006.01)
(52) U.S. Cl. .................................................. 320/166
(58) Field of Classification Search ................. 320/107, 320/166, 167; 361/212
See application file for complete search history.

(56) References Cited

U.S. PATENT DOCUMENTS

| | | | |
|---|---|---|---|
| 4,626,978 A * | 12/1986 | Thouvenin | 363/36 |
| 6,462,935 B1 | 10/2002 | Shiue et al. | |
| 7,054,129 B2 * | 5/2006 | Aida et al. | 361/220 |
| 2003/0128571 A1 | 7/2003 | Kawashima | |
| 2004/0174654 A1 | 9/2004 | Aida et al. | |

OTHER PUBLICATIONS

International Search Report and Written Opinion in PCT/SG2007/000269 mailed on Dec. 13, 2007, 9 pages.

* cited by examiner

*Primary Examiner* — Edward Tso
(74) *Attorney, Agent, or Firm* — Knobbe Martens Olson & Bear LLP (57) ABSTRACT

A power supply device and system have an electrically polarized element in which a remnant electrical polarization is formed and retained. Electrodes are formed on the electrically polarized elements and the remnant electrical polarization generates an electrical potential on the electrodes. Electrical circuits are coupled to the electrically polarized element to control the external electric charges attracted and distributed on the electrodes, for establishing the electrical potential on the electrodes. The electrodes can output electric currents by controlling the external electric charges distribution. The electrically polarized element may be made of ferroelectric material, including a ferroelectric bulk ceramic, ferroelectric multilayer ceramic, ferroelectric single crystal, ferroelectric thin film, ferroelectric thick film and ferroelectric polymer, and all the other materials with electric polarization retained therein. Power supply devices and systems made according to the present invention have very long standby time, small in size and efficient for many applications including RF systems.

28 Claims, 8 Drawing Sheets

POWER SUPPLY DEVICE AND SYSTEM

CROSS-REFERENCE TO RELATED APPLICATIONS

This application is a national phase of International Application No. PCT/SG2007/000269, filed Aug. 22, 2007, which claims the benefit of U.S. Provisional Application No. 60/839,547, filed Aug. 22, 2006, both of which are incorporated herein by reference in their entirety.

FIELD OF THE INVENTION

The present invention relates to a power supply device and system. In particular, it relates to a power supply device and system that provide electric power with long energy storage and/or long energy standby time.

BACKGROUND OF THE INVENTION

Conventional electric power supply devices and systems, such as batteries, fuel cells, solar cells, are used to provide stable and continuous electric power for a variety of electrical devices. These batteries or fuel cells usually involve converting chemical energy or light energy into electrical energy, and are indispensable in many portable electronic circuit applications. These types of power supplies however suffer from short storage life spans due to high electric leakage. Thus they do not have a long standby time without being recharged or replaced. In addition, the physical sizes of these types of batteries are difficult to be miniaturized, and the costs are relatively high due to their delicate internal structures.

For electric energy storage, capacitors are also not suitable to store energy for a long time due to electric leakage. As such, conventional batteries, fuel cells and capacitors are not preferred for some applications by which long energy standby time is needed, such as portable Radio Frequency IDentification (RFID) devices, particularly those used for tamper indicating electric seals. The attachment of a conventional battery particularly does not make sense for RFID tags used for tamper indicating electric seals, in which low but long standby power is utilized only temporally for transmitting the RF signals, sometimes once in life. No currently available power supply device or system is suitable for such temporal, low power supply but with long standby time. The continuing success in RFID systems and applications is being limited by the lack of efficient and appropriate power supply device.

Many energy harvesting mechanisms have been explored for RF systems and applications, including devices and systems capable of converting optical, magnetic, thermal, and mechanical energy into electricity. However, these types of energy conversion devices and systems have relatively complicated structures. In addition, these types of devices and systems are not suitable for use in applications where no other type of energy source is available. For example, a mechanical source is not available for a stationary object, an optical source is not available for items stored in the dark, etc. This is particularly the case in which, RF tags are to be used for tamper indicating electric seals.

SUMMARY OF THE INVENTION

Embodiments of the present invention provide a power supply device and system for applications that demand long standby time and miniature physical size, such as portable RF systems, RF-ID tags, particularly for tamper indicating electric seals.

According to one aspect, a power supply device according to embodiment of the present invention has an electrically polarized element in which an electrical polarization is retained. Electrodes are formed on surfaces of the electrically polarized elements, and the electrical polarization generates an electrical potential on the electrodes. Electrical circuits may be coupled to the electrically polarized element to control the external electric charges attracted and distributed on the electrodes, accompanied by changing the electrical potential on the electrodes. By controlling the external electric charges distribution, the electrodes can output electric currents. The electrically polarized element may be made of ferroelectric material, including a ferroelectric bulk ceramic, ferroelectric multilayer ceramic, ferroelectric single crystal, ferroelectric thin film, ferroelectric thick film and ferroelectric polymer, or any other materials with electric polarization retained therein. Compared to conventional power supply devices, the power supply devices and systems made according to the present invention have very long energy storage time and standby time, small in size and suitable for supplying electric powers to many applications including RF systems.

BRIEF DESCRIPTION OF THE DRAWINGS

These and other aspects and advantages of the present invention will be described in detail with reference to the accompanying drawings, in which.

DETAILED DESCRIPTION OF THE PREFERRED EMBODIMENTS

According to embodiments of the present invention, electric polarization existing in elements with structural and electric asymmetry is utilized for electric power supply. For the purpose of illustration, ferroelectric material is used as an example of the electrically polarized element, to describe power supply devices and systems according to embodiments of the present invention. However, it should be appreciated that the present invention is not limited to power devices and systems made of ferroelectric material. Other materials with similar properties, e.g. with the center of positive charge not completely overlapping the center of negative charge, may well be suitable for making the power devices, in a manner similar to ferroelectric materials. These other materials may include, for example, quartz, ZnO, AlN, etc.

Taking the ferroelectric material as an example, ferroelectricity is defined as a physical phenomenon in which a spontaneous electric polarization exists in a material (i.e., ferroelectric material), and the electric polarization in the material (ferroelectric element) can be re-oriented from one direction to another, by an external electric field applied thereto. The reorientation process involves two or more domain states within the crystal (or within individual grains in a ceramic material). Upon polarization, net positive charges are present in the ferroelectric element adjacent to one surface, and net negative charges are present adjacent to the opposite surface.

On the surfaces of the ferroelectric element, external electric charges will be collected to screen the polarization inside the element, due to the remnant electrical polarization generated from the polarized ferroelectric element. The power supply mechanism according to embodiments of the present invention is to control the distribution of the surface charges collected on the surfaces of the polarized ferroelectric element.

Figure 1:
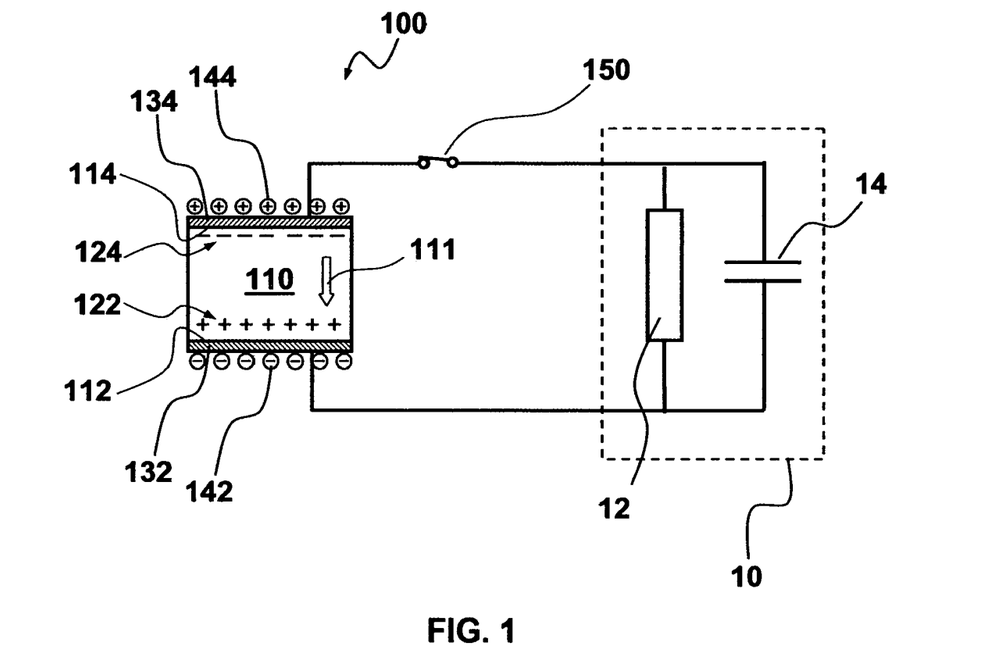
FIG. 1 is a schematic diagram showing a power supply device according to one embodiment of the present invention.

Reference is now made to FIG. 1, which shows a power supply device 100 according to one embodiment of the present invention. Device 100 includes an electrically polarized element, for example an electrically polarized ferroelectric element 110, with an electric polarization formed inside. In the present embodiment, electrically polarized ferroelectric element 110 has a remnant electrical polarization 111 formed inside the element after the element is electrically poled. The electric poling is a process in which an external electric field is applied to a ferroelectric element, to force the electric dipoles and domains of the ferroelectric element to reorient along with the external electric field. After the electric poling, at least part of the electric dipoles are reoriented and polarization is retained along the external electric field direction even after the electric field is removed, resulting in net positive charges 122 and net negative charges 124 being generated inside the ferroelectric element 110. For the purpose of illustration, net positive charges 122 are shown at positions adjacent to bottom surface 112, and net negative charges 124 are shown at positions adjacent to top surface 114, of the electrically polarized ferroelectric element 110.

Ferroelectric element 110 has a bottom electrode 132 and a top electrode 134, formed on bottom and top surfaces 112 and 114, respectively. The remnant electrical polarization 111 is therefore to generate an electric potential on the first and second electrodes 132 and 134.

When placed in an environment having surrounding external electric charges or particles, such as in a normal atmosphere environment, and due to the electrostatic interaction with the remnant polarization in the ferroelectric element 110, negative charges 142 will be attracted on bottom electrode 132, and positive charges 144 will be attracted on top electrode 134, both mainly from surrounding environment. The bottom and top electrodes 132 and 134 may stop attracting external charges when the level of electrostatic charges on both the bottom and top electrodes are balanced.

When the polarized ferroelectric element 110 is electrically connected to a load 10, such as an external electric circuit with a resistor 12 and a capacitor 14 connected in parallel, and when control switch 150 is closed, the electric boundary condition on the bottom and top electrodes 132 and 134 will be changed, resulting in a portion of the negative charges 142 and positive charges 144 flowing through the circuit of load 10. Accordingly, a transient current is supplied to the load 10. An electric power supply device, in this embodiment the electrically polarized ferroelectric element 110 can now supply a transient electric current by coupling to load 10.

Figure 2:
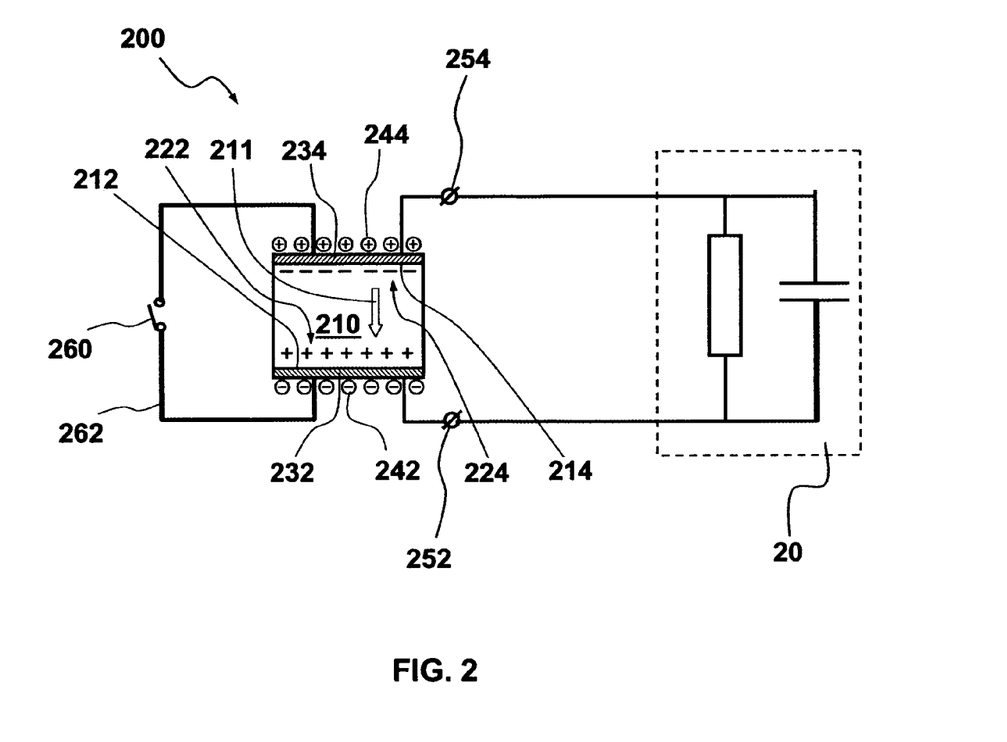
FIG. 2 is a schematic diagram showing a power supply device according to to another embodiment of the present invention.

FIG. 2 shows a power supply device 200 according to another embodiment of the present invention. Power supply device 200 includes an electrically polarized ferroelectric element 210, having net positive charges 222 generated adjacent to bottom surface 212, and net negative charges 224 generated adjacent to top surface 214. Further, ferroelectric element 210 is structured with bottom and top electrodes 232 and 234 in a manner similar to the ferroelectric element 110 shown in FIG. 1. A remnant electrical polarization 211 in the ferroelectric element 210 is therefore to generate an electric potential on the first and second electrodes 232 and 234.

In the present embodiment, power supply device 200 includes a switch 260 electrically coupled between bottom electrode 232 and top electrode 234. When switch 260 is open, bottom electrode 232 and top electrode 234 attract external opposite electric charges 242 and 244, in a manner similar to that shown in FIG. 1, until a first balance status is reached. Here, the first balance status refers to a situation where, the electric potential generated by the remnant electrical polarization 211 in the ferroelectric element 210 is neutralized by the electric charges 242 and 244 on the bottom electrode 232 and top electrode 234, when the switch 260 is open.

In the stand-by state, switch 260 is firstly closed to form a short-circuit 262 between bottom electrode 232 and top electrode 234. A portion of the external charges 242 and 244 will then be redistributed through the short-circuit 262, resulting in the first balance status being broken and a second balance status being established. The second balance status refers to a situation where, the electric potential generated by the remnant electrical polarization 211 in the ferroelectric element 210 is neutralized by both the short circuit 262 (when the switch 260 is closed) and a remaining portion of the electric charges 242 and 244 on the bottom electrode 232 and top electrode 234.

When it is desired to supply electric current, the switch 260 is opened to disconnect the short-circuit 262 by which, the second balance status is broken. This will result in the change of electrical potential on the bottom electrode 232 and top electrode 234. Accordingly, a transient current will flow through terminals 252 and 254 connected to bottom and top electrodes 232 and 234, hence the power supply device 200 can now supply electric current to load 20.

Figure 3:
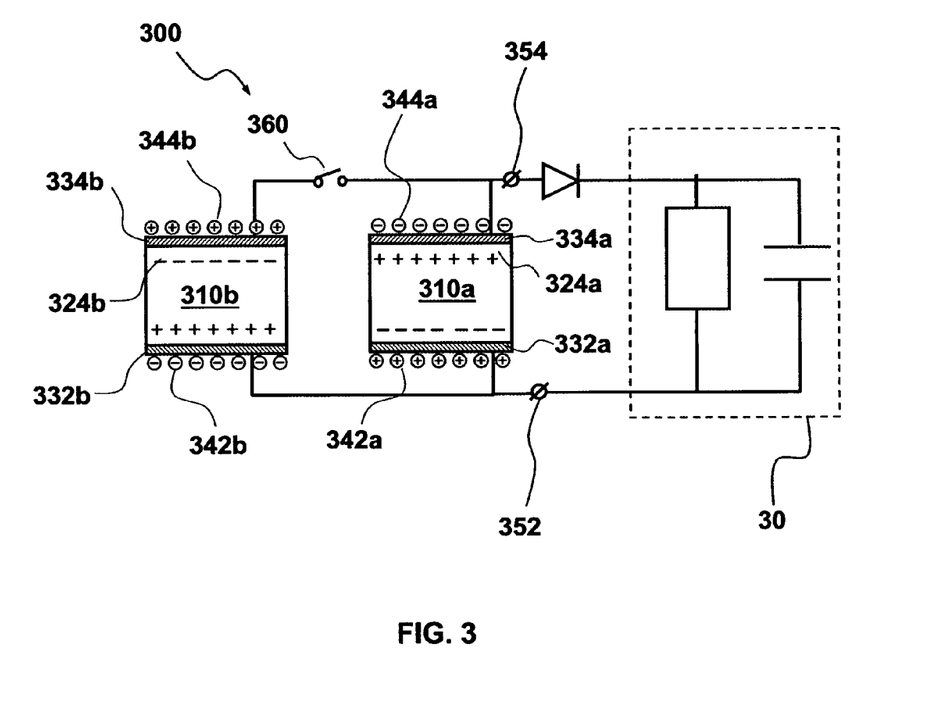
FIGS. 3, 4 and 5 are schematic diagrams showing power supply devices according to various further embodiments of the present invention.
Figure 4:
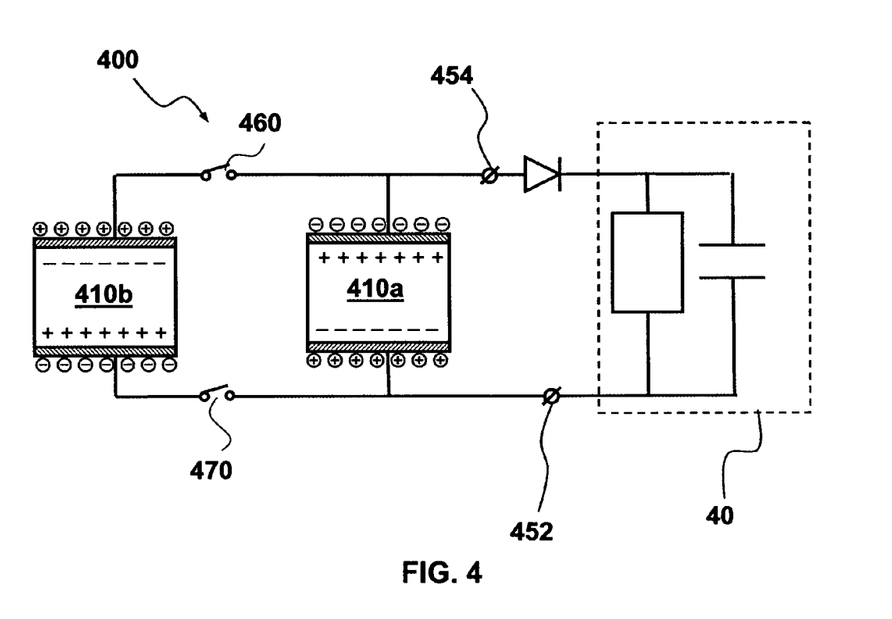
Figure 5:
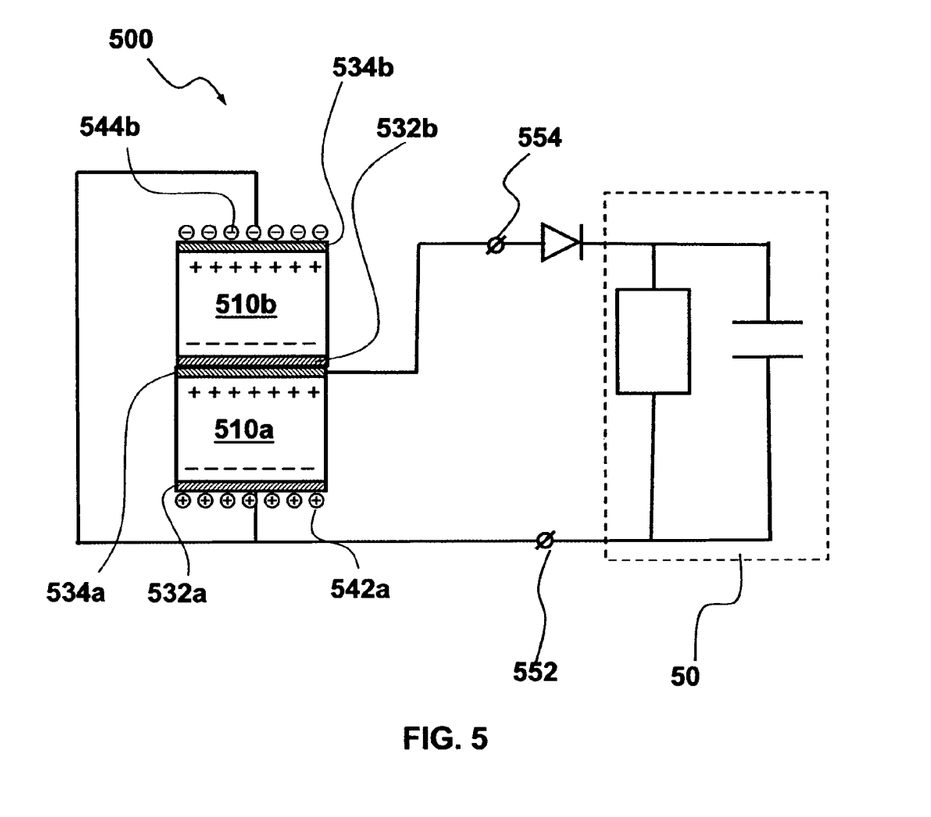

FIGS. 3 to 5 show power supply systems employing two pieces of electrically polarized ferroelectric elements according to further embodiments of the present invention. The ferroelectric elements in these embodiments are substantially the same as that shown in FIG. 1 and FIG. 2.

In FIG. 3, a power supply system 300 includes two ferroelectric elements 310a and 310b which are coupled to each other via a switch 360. An anode 334a at which net positive charges 324a of first ferroelectric element 310a is generated, is coupled to a cathode 334b at which net negative charges 324b of second ferroelectric element 310b is generated, via a switch 360. Further, a cathode 332a of first ferroelectric element 310a is coupled to an anode 332b of second ferroelectric element 310b. When switch 360 is open, external charges 342a, 344a, 342b, 344b are attracted on respective anode and cathodes, until a first balance status is established. At the first balance status, the electric potential generated by the remnant electrical polarization in the first ferroelectric element 310a is neutralized by the electric charges 342a and 344a on the bottom electrode 332a and top electrode 334a, when switch 360 is open.

For the power supply device 300, switch 360 is firstly closed to connect the second element 310b to the first element 310a. A portion of the external charges 342a and 344a are then redistributed by the connection to the second element 310b, resulting in the first balance status being broken and a second balance status being established. At the second balance status, the electric potential generated by the remnant electrical polarization in the first ferroelectric element 310a is neutralized by both the second element 310b and a remaining portion of the electric charges 342a and 344a on the bottom electrode 332a and top electrode 334a.

When it is desired to supply electric current, the switch 360 is opened to disconnect the second element 310b from the first element 310a and hence the second balance status is broken. This will result in the establishment of an electrical potential on the bottom electrode 332a and top electrode 334a. Accordingly, a transient current will flow through terminals 352 and 354 connected to bottom and top electrodes 332a and 334a, hence the power supply system 300 can now supply electric current to load 30.

In one preferred embodiment, the two ferroelectric elements 310a and 310b are identical.

A power supply system 400 shown in FIG. 4 has a modified configuration based on the power supply system 300 shown in FIG. 3. Two ferroelectric elements 410a and 410b are coupled to each other via two switches 460 and 470, with opposite electrodes coupled to each other. When switches 460 and 470 are open, the electrodes of first ferroelectric element 410a attract external charges on its electrodes, resulting in an establishment of a first balance status in first ferroelectric elements 410a.

For the power supply device 400, both switches 460 and 470 are firstly closed to connect the second element 410b to the first element 410a. A portion of the external charges of the first element 410a are then redistributed by the connection to the second element 410b, resulting in the first balance status being broken and a second balance status being established. At the second balance status, the electric potential generated by the remnant electrical polarization in the first ferroelectric element 410a is neutralized by both the second element 410b and a remaining portion of the electric charges on the electrodes of first element 410a.

When it is desired to supply electric current, both switches 460 and 470 are opened to disconnect the second element 410b from the first element 410a and hence, the second balance status is broken. This will result in the establishment of an electrical potential on the electrodes of first element 410a. Accordingly, a transient current will flow through terminals 452 and 454 connected to electrodes of first element 410a, hence the power supply system 400 can now supply electric current to load 40.

In one preferred embodiment, the two ferroelectric elements 410a and 410b are identical.

A power supply system 500 shown in FIG. 5 has a further modified configuration based on the power supply system 300 shown in FIG. 3. Power supply system 500 has two electrically polarized ferroelectric elements 510a and 510b serially coupled to each other, and with top electrode 534a of ferroelectric element 510a physically contacted with bottom electrode 532b of second ferroelectric elements 510b. Bottom electrode 532a of ferroelectric element 510a is electrically coupled to top electrode 534b of second ferroelectric elements 510b, and coupled to a first terminal 552. A second terminal 554 is bonded to electrode 534a.

By having the first and second ferroelectric element 510a and 510b physically contacted to each other at the opposite polarization terminals, external charges are prevented from being attracted to the contact surfaces, i.e. the top electrode 534a of first ferroelectric element 510a and bottom electrode 532b of second ferroelectric elements 510b will attract significantly less external charges. The reason is that the electric charges of opposite signs near the contact interface can screen each other. When external electric charges 542a and 544b are attracted onto respective electrodes 532a and 532b, the stacked first and second ferroelectric elements 510a and 510b reach a first balance status.

When the first and second ferroelectric elements 510a and 510b are physically separated in an instant, the prior-contacted electrodes 534a and 532b are separated apart, and unscreened net charges near the surfaces are exposed to surrounding environment, resulting in attraction of external charges thereon, and hence causing the first balance status broken. After the separation, terminal 544 is still connected with the top electrode 534a of the first ferroelectric element 510a but disconnected from the bottom electrode 532b of the second ferroelectric element 510b. Electrical charges are then demanded from the load 50, in an attempt to resume the balanced status, and thus a transient current is produced through the load 50.

Power supply systems according to the present embodiments are particularly useful for applications in which a physical displacement is to be detected. In one example, a first polarized ferroelectric element may be attached to one part of a seal, and a second polarized ferroelectric element may be attached to another part of the seal. In another example, the physical displacement of an object is utilized to turn on/off a switch. The first and second polarized elements are then electrically connected according to the manner shown in FIG. 5, or as the switches shown in FIGS. 1-4, with an alarm device connected as a load. When the seal is broken or when the switch is triggered, an electric current is generated from the polarized element to supply to the alarm device, which could be an RF transmitter. The broken of the seal or triggering of switch can therefore be detected.

Figures 6A, 6B:
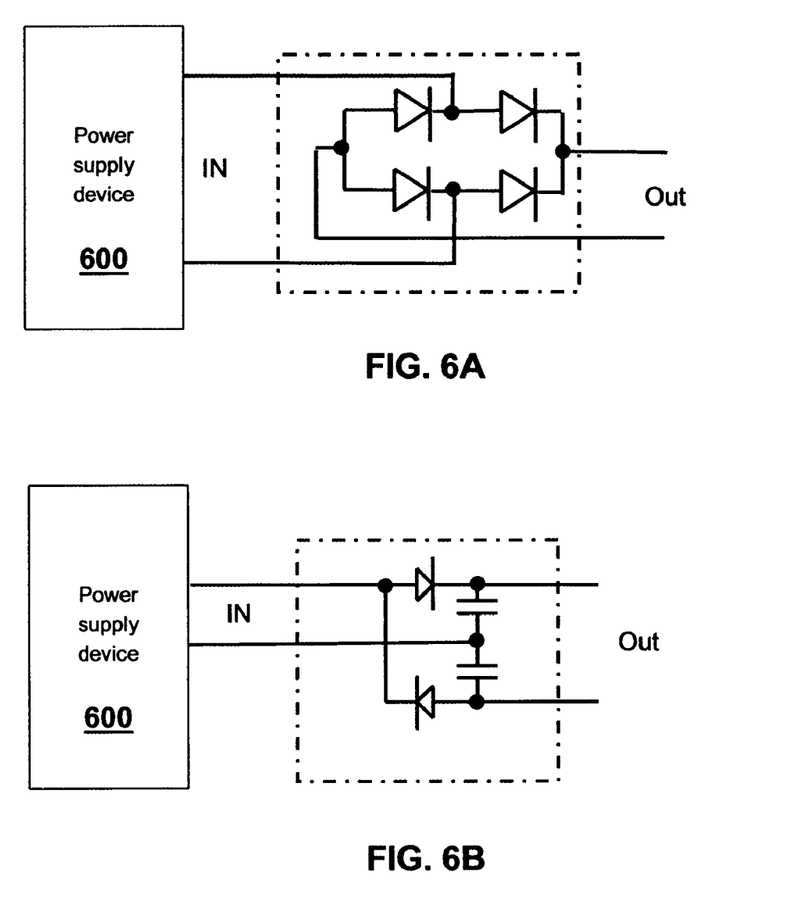
FIGS. 6A, 6B and 6C are schematic diagrams showing power supply devices according to embodiments of the present invention when coupled to various types of electronic circuits.
Figure 6C:
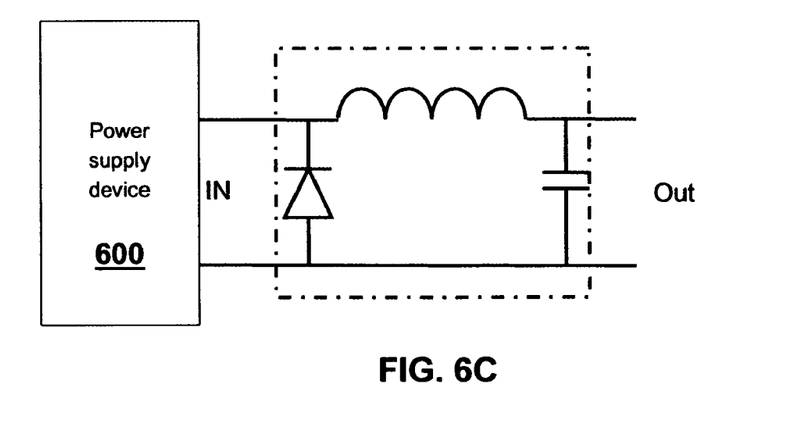

A large variety of electronic circuits may be used together with the power supply devices and systems according to the present invention illustrated, to meet various different applications. For example, diodes, capacitors and/or inductors may be used in a power supply device or system as a filter, a rectifier and/or a temporary electricity reservoir or storage. Instead of the single diode as the rectifier shown in FIGS. 3, 4 and 5, other configurations of diodes, capacitors and/or inductors may also be used including a full wave rectifier, a voltage doubling circuit (which is a degeneration from the Cockroft-Walton voltage multiplier circuit), or a filter/storage circuit module with an inductor, capacitor and diode, to couple to a power supply device 600, as shown in FIGS. 6A, 6B and 6C. One capacitor or plural capacitors can be used as a temporary charge storage circuit to control the transient discharging process or the duration of the current supply.

The power supply device according to an embodiment shown in FIG. 3 is now taken as an example to show experimental results, which has the following properties/parameters:

Ferroelectric materials: Similar ferroelectric lead zirconate titanate (PZT)

ceramic disks: $\phi$ 25×1 mm; Capacitance: 5.7-5.8 nF; tg$\delta$: 0.003.

Capacitor: 100 nF;

Switch: on/off single pole switch;

Resistor: Three distinct values of 100 K$\Omega$, 1 M$\Omega$ and 10 M$\Omega$,

Diode: Schottky barrier, 1N4148 or equivalent.

Figure 7:
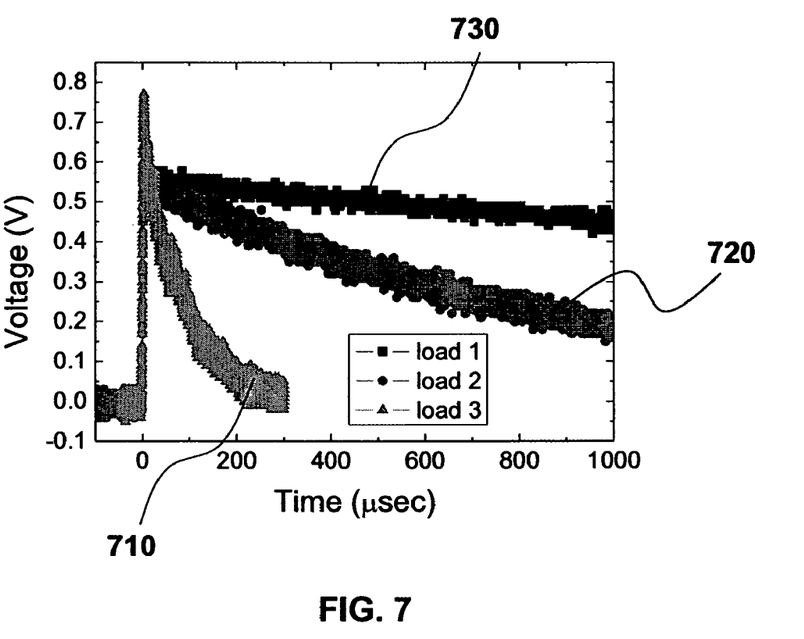
FIG. 7 is a chart showing experimental results of samples prepared according to embodiment showing in FIG. 3.

An oscilloscope is used to record the data/waveform obtained. In this case, this waveform represents the transient voltage curve with respect to time in the RC load. FIG. 7 shows the experimental results obtained through the measurements. The three curves in FIG. 7 correspond to the three distinct current demands simulated experimentally by different resistance values, which curves 710, 720 and 730 corresponds to the 100 KΩ resistor, 1 MΩ resistor and 10 MΩ resistor, respectively. With rising electrical current corresponding to a smaller resistance load, the faster the energy depletes, thus leading to falling voltage output more quickly. The discharge voltage typically peaks within a range from 0.60 to 0.75 V as measured after the diode, with a maximum peak current at 7.5 μA for the 100 KΩ load. The duration (considered from 90% to 10%) varies from 8 milli-second (msec) to less than 0.2 msec depending on the load. The peak power is about 5.6 μW for a 100 kΩ load; the peak power is about 0.36 μW for a 1 MΩ load.

It is observed that the temporal power is provided repetitively by switching the switch 360 on and off. The three curves in FIG. 7 are also obtained from the same pair of the ferroelectric elements without any re-poling process between the three tests.

Figure 9:
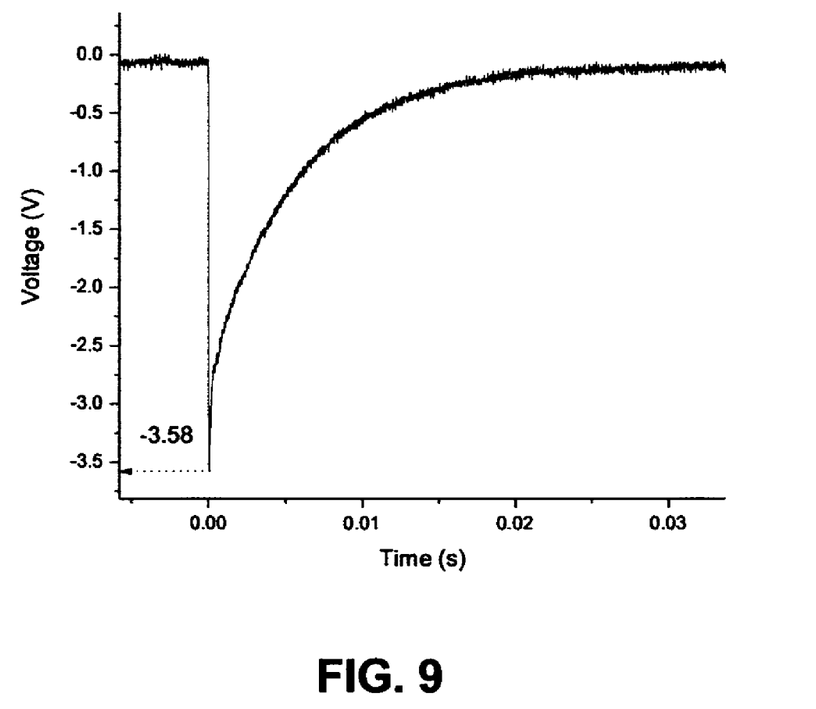
FIG. 9 is a chart showing further experimental results of samples prepared according to another embodiment as shown in FIG. 3 but with the orientation of the diode reversed.

Further results of this can be seen in FIG. 9, where a discharge peak voltage of 2.5 V and a maximum power output of 62 μW for a 100 kΩ load is achieved using another two ferroelectric lead zirconate titanate disks. The result is obtained with the embodiment as shown in FIG. 3, except that the orientation of the diode is reversed. This power can be used for many varied electronic applications, and is sufficient for RF signal transmission.

It should be appreciated by a person skilled in the art that although only bulk ferroelectric ceramic disks are used in the construction of this system, other materials with remnant electric polarization can also be used in power supply devices and systems according to the present invention. Examples of these other types of suitable materials includes, but not limited to, ferroelectric single crystals, ferroelectric composites, ferroelectric thin and thick films, ferroelectric multilayer materials, ferroelectric polymers, and all the other materials with electric polarizations.

Figure 8:
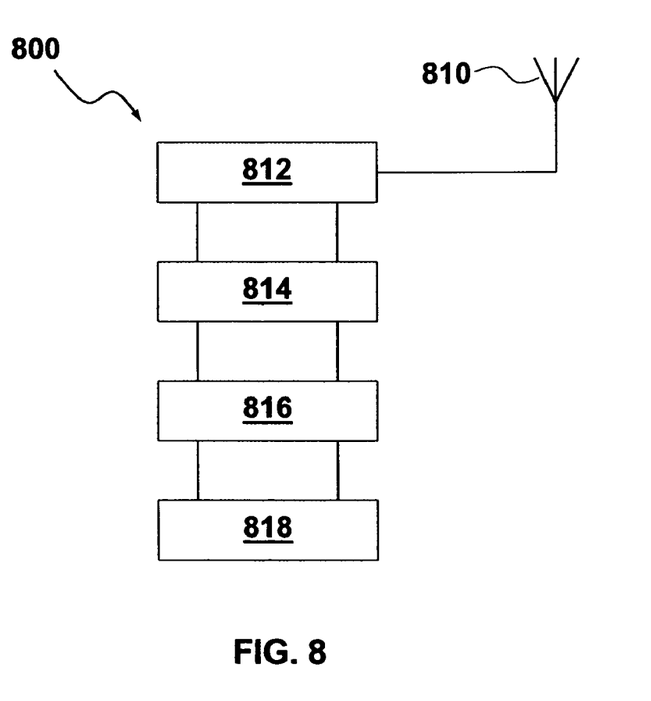
FIG. 8 is a schematic diagram showing an RFID system according to embodiments of the present invention.

FIG. 8 shows an RFID system 800 employing a power supply device or system according to one embodiment of the present invention. As an application example, a power supply device or system according to embodiments of the present invention is used to supply power to a low power RFID transmitter 812. The RFID transmitter 812 can emit prerecorded signals through an antenna 810 to a predetermined receiver (not shown). With the temporal power supply device 818 coupled to the RFID transmitter 812 optionally through a rectifier 816, a filter and storage circuit 814, the RF signal emission is simultaneously triggered. Conceptually, the RF emission module design is substantially the same as that of the existing portable RF systems, but the power supply device 818 replaces the conventional energy sources, including various batteries, solar cells, or any other prior known power scavenging mechanisms.

In one application, the temporal power system as disclosed herein is also applicable for RFID systems particular for tamper indicating electronic seal. The long standby time, simple structure, and low cost of the present invention is particularly useful for RFID applications for tamper indicating electric seal.

Although embodiments of the present invention have been illustrated in conjunction with the accompanying drawings and described in the foregoing detailed description, it should be appreciated that the invention is not limited to the embodiments disclosed, and is capable of numerous rearrangements, modifications, alternatives and substitutions without departing from the spirit of the invention as set forth and recited by the following claims.

The invention claimed is:

1. A power supply comprising:
    an electrically polarized element;
    a first electrode on a first surface of said electrically polarized element;
    a second electrode on a second surface of said electrically polarized element, wherein said second surface is on an opposite side of said element from said first surface; and
    wherein a remnant of an electrical polarization in said electrically polarized element causes a first charge to collect on said first electrode and a second opposite charge to collect on said second electrode to create an electrical potential between said first and second electrode.

2. The power supply of claim 1, further comprising a first connection that connects said first electrode to said second electrode through a load.

3. The power supply of claim 1, wherein said load comprises a radio frequency signal transmission device.

4. The power supply of claim 2, further comprising a first switch along said first connection between said first electrode and said second electrode wherein said first switch completes a circuit when in a closed position to cause current to flow between said first electrode and said second electrode to establish a balance status of the electrical charges.

5. The power supply of claim 2, further comprising:
    a second connection that directly connects said first electrode to said second electrode; and
    a second switch along said second connection wherein said second switch causes a short circuit between said first electrode and said second electrode responsive to said second switch being in a closed position and to cause a break in a balance status to cause a change in electrical potential between said first electrode and said second electrode and causes a transient current to flow over a first connection responsive to said second switch being in an open position.

6. The power supply of claim 2, wherein said first electrode is a cathode and second electrode is an anode, said power supply further comprising:
    a second electrically polarized element;
    a third electrode on a first surface of said second electrically polarized element wherein said third electrode is a cathode;
    a fourth electrode on a second surface of said second electrically polarized element wherein said second surface is on an opposite side of said second element from said first surface wherein said fourth electrode is an anode;
    a third connection between said first electrode and said fourth electrode; and
    a fourth connection between said second electrode and said third electrode.

7. The power supply of claim 6, further comprising a third switch in said third connection between said first and fourth electrodes, wherein said third switch is first set to a closed position to cause electric charges to collect on said first, second, third and fourth electrodes, said third switch is then set to an open position to break a balance status to cause an electrical potential over said first electrically polarized element to supply current to said load over said first connection.

8. The power supply of claim 7, further comprising a fourth switch in said fourth connection between said second and third electrodes, wherein said third and fourth switches are firstly in a closed position to cause electric charges to collect on said first, second, third, and fourth electrodes, said third and fourth switches are closed causing said electric charges on said first and second electrodes to be redistributed to said third and fourth electrodes neutralizing said electrical potential on said first electrically polarized element, and said third and fourth switches are then opened to supply electric current to said load over said first connection.

9. The power supply of claim 6, wherein said third connection comprises a direct physical contact between said first and fourth electrodes, wherein said physical contact causes said first and fourth electrode to screen each other and a separation of said direct physical contact causes external electric charges to be attracted to said first and fourth electrodes and causes said load to receive current.

10. The power supply of claim 1, further comprising a current filter circuit coupled to said electrically polarized element.

11. The power supply of claim 1, further comprising a current rectifier circuit connected to said electrically polarized element.

12. The power supply of claim 1, further comprising a temporary charge storage circuit connected to said electrically polarized element.

13. The power supply of claim 1, wherein said electrically polarized element comprises: a polarized ferroelectric element.

14. The power supply of claim 13, wherein said polarized ferroelectric element is selected from a group consisting of ferroelectric bulk ceramic, ferroelectric multilayer ceramic, ferroelectric single crystal, ferroelectric thin film, ferroelectric thick film, and ferroelectric polymer.

15. A method for providing power to a load comprising:
inducing charges on a first electrode fanned on a first surface of a first electrically polarized element and a second electrode formed on a second surface of said first electrically polarized element, wherein said second surface is on an opposite side of said first electrically polarized element from said first surface; and
switching a circuit connecting said first and second electrodes between a first connection to establish a balance status of the electric charges on the first and second electrodes, and a second connection to break the balance status to establish an electrical potential on said first and second electrodes.

16. The method of claim 15, further comprising connecting said first electrode to said second electrode through a load via said first connection.

17. The method of claim 16, wherein said step of connecting said first and second electrodes to a load comprises closing a first switch along said first connection between said first electrode and said second electrode wherein closing said first switch completes a circuit of said first connection to cause current to flow between said first electrode and said second electrode.

18. The method of claim 16, further comprising directly connecting said first electrode to said second electrode along said second connection.

19. The method of claim 18, further comprising closing a second switch along said second connection to cause a short circuit between said first electrode and second electrode to neutralize said electrical potential of said first electrically polarized element.

20. The method of claim 18, further comprising opening said second switch causing a change in electrical potential between said first electrode and said second electrode to cause a transient current to flow over said first connection.

21. The method of claim 15, wherein said first electrode is a cathode and said second electrode is an anode, said method further comprising:
connecting a third electrode on a first surface of a second electrically polarized element to said second electrode wherein said third electrode is a cathode;
connecting a fourth electrode on a second surface of said second electrically polarized element to said first electrode wherein said second surface is on an opposite side of said second element from said first surface wherein said fourth electrode is an anode.

22. The method of claim 21, further comprising closing a third switch along a connection between said first and fourth electrodes wherein said third switch to cause electric charges to be attracted to said first, second, third and fourth electrodes.

23. The method of claim 22, further comprising opening said third switch between said first and fourth electrodes to supply current to said load.

24. The method of claim 22, further comprising closing a fourth switch along a connection between said second and third electrodes to cause electric charges to collect on said first, second, third, and fourth electrodes.

25. The method of claim 24, further comprising closing said third and fourth switches causing said electric charges on said first and second electrodes to be redistributed to said third and fourth electrodes neutralizing said electrical potential on said first electrically polarized element.

26. The method of claim 25, further comprising opening said third and fourth switches to supply current to said load.

27. The method of claim 21, further comprising making a direct physical contact between said first and fourth electrodes wherein said physical contact causes said first and fourth electrode to screen each other.

28. The method of claim 27, further comprising separating said direct physical contact to cause external charges to be attracted to said first and fourth electrodes and cause said load to receive current.

* * * * *